(12) United States Patent
Pan (10) Patent No.: US 7,367,576 B2
(45) Date of Patent: May 6, 2008

(54) FOLDABLE BICYCLE

(76) Inventor: Liang-Fong Pan, No. 25, Lane 256, Yu-Yuan S. Rd., Lung-Ching Hsiang, Tiachung Hsien (TW)

( * ) Notice: Subject to any disclaimer, the term of this patent is extended or adjusted under 35 U.S.C. 154(b) by 355 days.

(21) Appl. No.: 11/256,908

(22) Filed: Oct. 24, 2005

(65) Prior Publication Data

US 2007/0018422 A1 Jan. 25, 2007

(30) Foreign Application Priority Data

Jul. 22, 2005 (TW) .............................. 94212451 U (51) Int. Cl.
*B62K 19/02* (2006.01)
(52) U.S. Cl. ...................... 280/278; 280/287; 280/259; 280/260; 280/261
(58) Field of Classification Search ................ 280/278, 280/287, 259, 260, 261
See application file for complete search history.

(56) References Cited

U.S. PATENT DOCUMENTS

| | | | | |
|---|---|---|---|---|
| 4,718,688 A * | 1/1988 | Sanders | ...................... | 280/278 |
| 4,895,386 A * | 1/1990 | Hellestam et al. | .......... | 280/287 |
| 6,764,090 B1 * | 7/2004 | Pan | ............................. | 280/278 |
| 7,290,780 B2 * | 11/2007 | Hsu | ............................ | 280/287 |
| 2004/0032110 A1 * | 2/2004 | Bigot | ......................... | 280/287 |
| 2005/0263979 A1 * | 12/2005 | Sinclair et al. | ............. | 280/278 |
| 2006/0131091 A1 * | 6/2006 | Lin | ............................. | 180/208 |
| 2006/0244237 A1 * | 11/2006 | Chuang | ...................... | 280/278 |
| 2007/0158928 A1 * | 7/2007 | Wu | ............................. | 280/278 |

\* cited by examiner

*Primary Examiner*—Lesley D. Morris
*Assistant Examiner*—Marlon Arce-Diaz
(74) *Attorney, Agent, or Firm*—Brinks Hofer Gilson & Lione (57) ABSTRACT

A foldable bicycle includes a head strut, a seat strut, and first and second bracing struts pivotally mounted to one another about four pivot axes such that lifting of a pivot joint of the first and second bracing struts towards the head strut results in turning of the first and second bracing struts to bring the bicycle into a folded position, where front and rear wheels are closer to each other and are held in tandem. A locking member is disposed to releasably lock the second bracing strut from turning relative to the first bracing strut when the bicycle is in a position of use.

8 Claims, 8 Drawing Sheets

FOLDABLE BICYCLE

CROSS-REFERENCE TO RELATED APPLICATION

This application claims priority of Taiwanese Application No. 094212451, filed on Jul. 22, 2005.

BACKGROUND OF THE INVENTION

1. Field of the Invention

This invention relates to a foldable bicycle, more particularly to a foldable bicycle with four linking joints for folding and unfolding the bicycle without the need to detach any component parts therefrom.

2. Description of the Related Art

Figure 1:
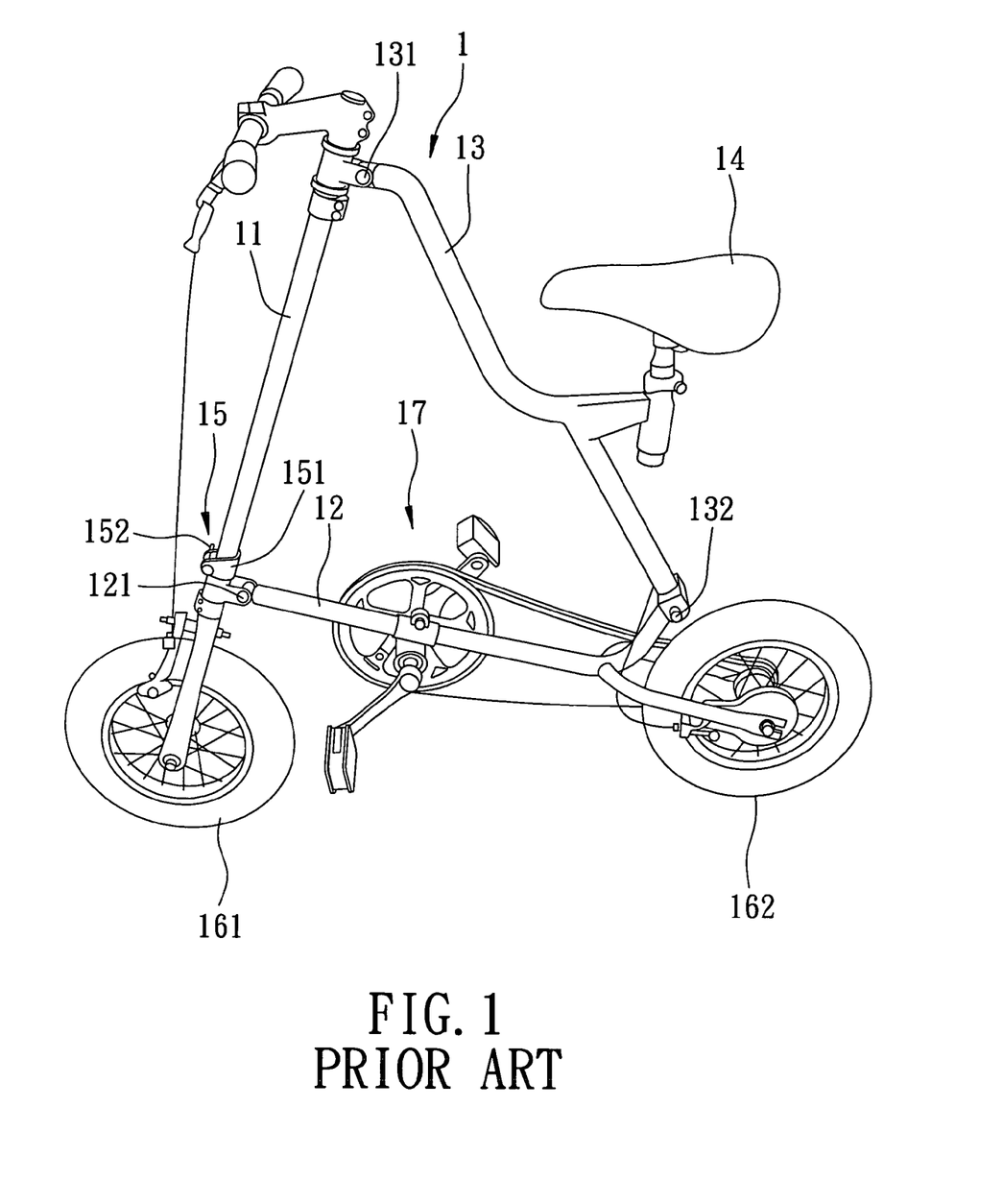
FIG. 1 is a perspective side view of a conventional foldable bicycle in an unfolded state.
Figure 2:
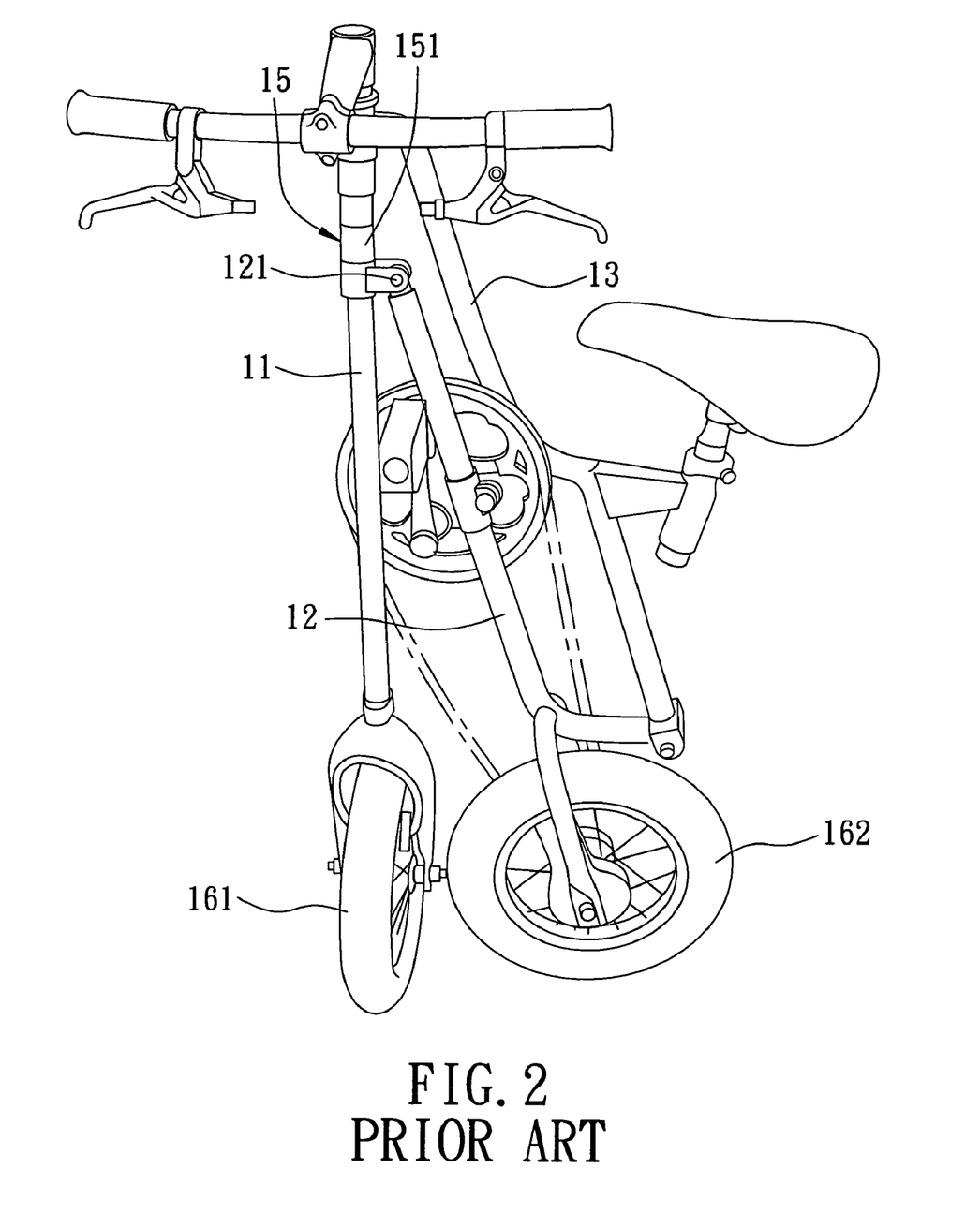
FIG. 2 is a perspective view of the conventional foldable bicycle in a folded state.

Referring to FIGS. 1 and 2, in a Taiwanese publication No. M265307, entitled "Rapidly and Easily Foldable Bicycle," there is disclosed a foldable bicycle 1 which includes a head tube 11, a bottom tube 12, a seat tube 13, a saddle 14, a locking device 15, front and rear wheels 161,162, and a transmitting device 17. The bottom tube 12 has one end pivoted to the head tube 11 at a first pivot point 121. The seat tube 13 has an end pivoted to the head tube 11 at a second pivot point 131, and an opposite end pivoted to the other end of the bottom tube 12 at a third pivot point 132. The saddle 14 is mounted on the seat tube 13 away from the head tube 11. The locking device 15 includes a sleeve 151 sleeved on the head tube 11, and a quick-release fastener 152 disposed to fasten the sleeve 151 to the head tube 11. The front and rear wheels 161,162 are pivotally mounted on two end extensions of the bottom tube 12. The transmitting device 17 is mounted on the bottom tube 12 to drive the rear wheel 162 so as to generate rotation of the wheels 161,162.

When it is desired to fold the bicycle 1, the fastener 152 is released so as to permit movement of the first pivot point 121 along the head tube 11. The head tube 11, the bottom tube 12 and the seat tube 13 can be folded by virtue of the second and third pivot points 131,132. However, it is difficult to move the bottom tube 12 along the head tube 11 smoothly due to change of the pivot angle therebetween during the folding operation, thereby resulting in inconvenient to the operator. Moreover, since the front and rear wheels 161,162 have the same wheel radius, they have to be relatively turned so as not to interfere with each other. Thus, the front and rear wheels 161,162 can not be maintained in tandem after folding to enable the folded bicycle to be pushed along, thereby resulting in inconvenience during transport of the bicycle 1.

SUMMARY OF THE INVENTION

The object of the present invention is to provide a foldable bicycle which can be easily and conveniently folded and unfolded, and which has front and rear wheels that can be maintained in tandem after folding so as to facilitate transportation. According to this invention, the foldable bicycle includes front and rear wheel axles which are disposed opposite to each other in a longitudinal direction, which respectively extend along front and rear axes oriented in a transverse direction for mounting front and rear wheels, respectively, a sprocket which is rotatable about a rotating axis to drive the rear wheel, a bicycle frame, and a locking member.

The bicycle frame includes a head strut, a seat strut, and first and second bracing struts. The head strut has a lower head portion connected to the front wheel axle, and an upper head portion to couple with a handlebar. The seat strut has a front seat end pivotally connected to the upper head portion about a first pivot axis, and an intermediate support portion extending rearwardly and downwardly from the front seat end to support a saddle, and terminating at a rear seat end that is disposed upwardly and forwardly of the rear wheel axle in a position of use. The first bracing strut has a first front end pivotally connected to the lower head portion about a third pivot axis parallel to and offset from the front wheel axis, and a first rear end pivotally connected to a second front end of the second bracing strut about a second pivot axis that is parallel to and offset from the rotating axis. The second bracing strut has a second rear end pivotally connected to the rear seat end about a fourth pivot axis, an intermediate bracing portion disposed between the second front and rear ends, and a rear stay disposed to interconnect the intermediate bracing portion and the rear wheel axle. The second front end is coupled to the sprocket to permit rotation of the sprocket thereon. Thus, lifting of the second front end towards the front seat end of the seat strut results in turning of the first and second bracing struts about the third and fourth pivot axes, respectively, so as to bring the bicycle into a folded position, where the front and rear wheel axles are closer to each other in the longitudinal direction and the front and rear wheels are held in tandem, and where the rear seat end is disposed rearwardly of the rear wheel axle.

The locking member is disposed to releasably lock the second bracing strut from turning relative to the first bracing strut when the front and rear wheels are in the position of use.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 3:
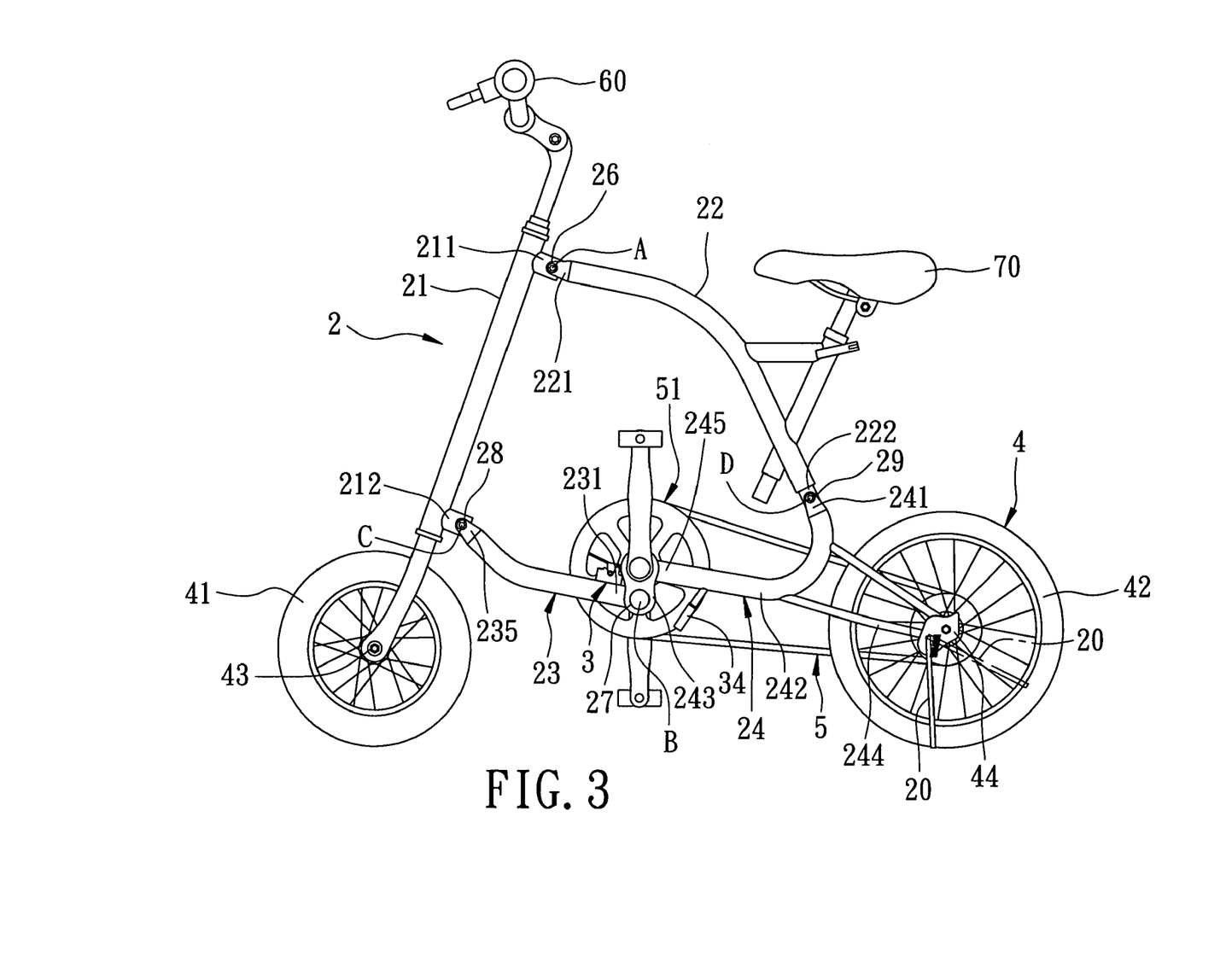
FIG. 3 is a schematic side view of the preferred embodiment of a foldable bicycle according to this invention when unfolded.
Figure 4:
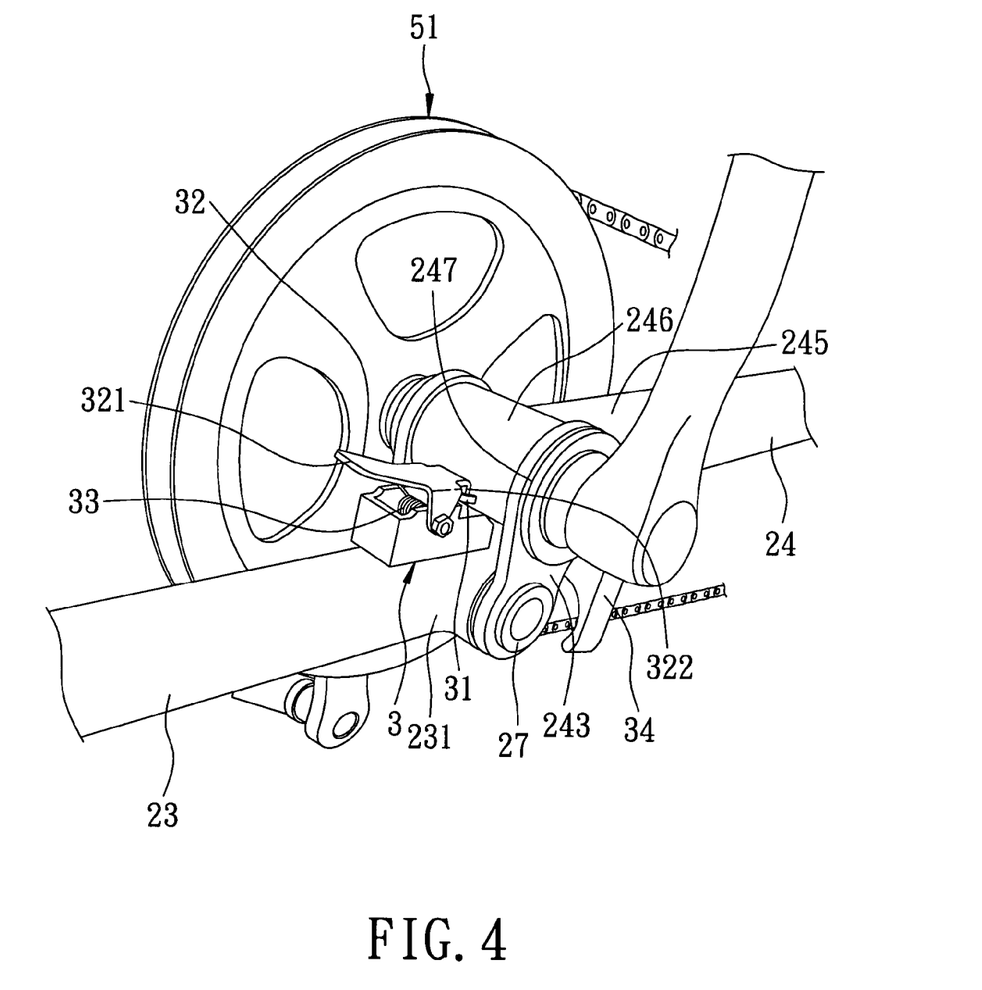
FIG. 4 is a fragmentary perspective view of a middle portion of the preferred embodiment.
Figure 5:
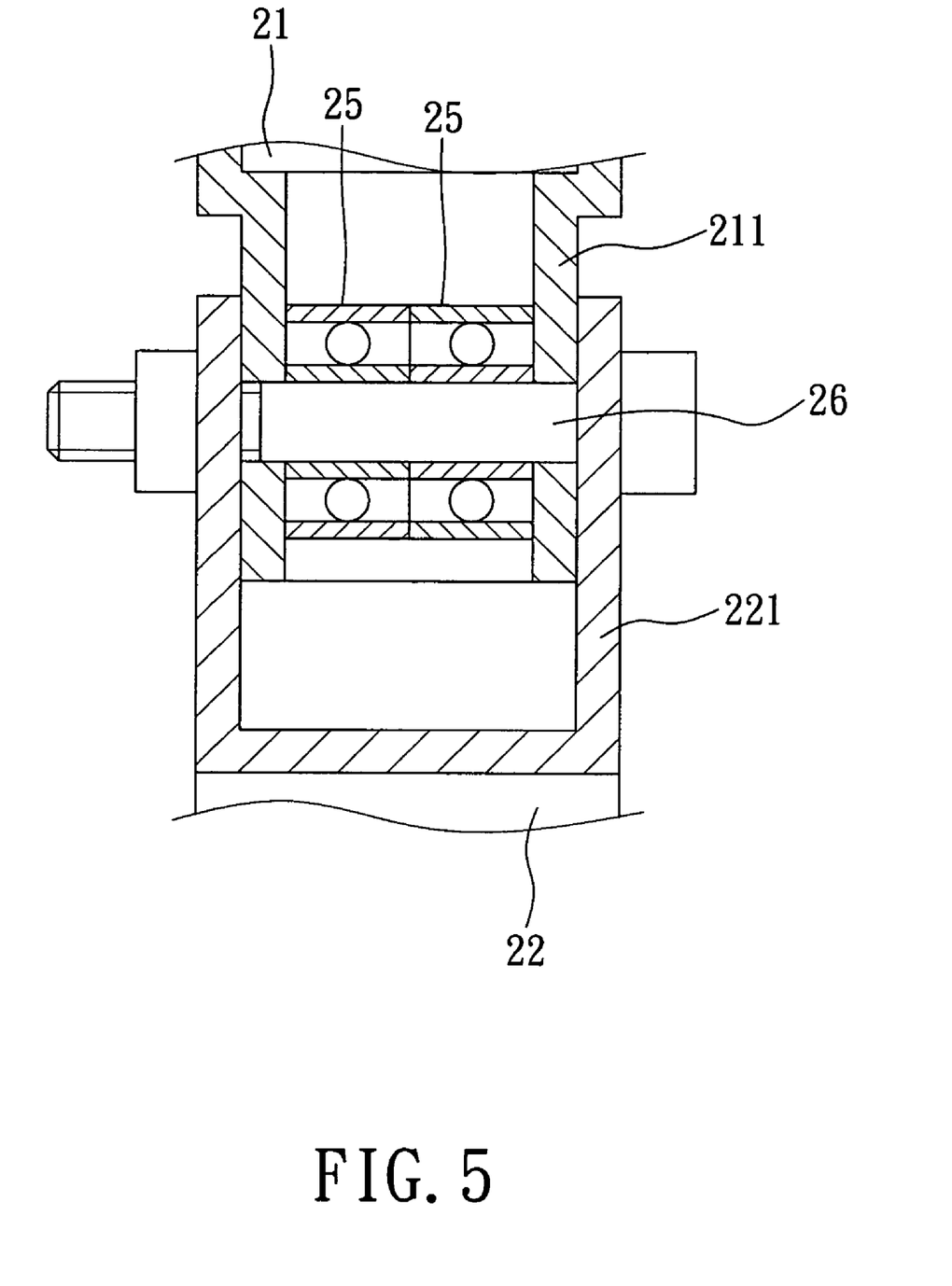
FIG. 5 is a fragmentary sectional view of a pivot joint of the preferred embodiment.

Referring to FIGS. 3 to 5, the preferred embodiment of a foldable bicycle according to the present invention is shown to comprise a wheel unit 4, a bicycle frame 2, a transmitting device 5, and a locking member 3.

The wheel unit 4 includes front and rear wheel axles 43,44 which are disposed opposite to each other in a longitudinal direction, and which respectively extend along front and rear axes oriented in a transverse direction, and front and rear wheels 41,42 which are respectively journalled on the front and rear wheel axles 43,44 and which are disposed in tandem in a position of use.

The bicycle frame 2 includes a head strut 21, a seat strut 22, and first and second bracing struts 23,24.

The head strut 21 has a lower head portion which is connected to the front wheel axle, and an upper head portion which is opposite to the lower head portion in an upright direction transverse to the longitudinal and transverse directions and which is adapted to couple with a handlebar 60. Each of the lower and upper head portions has a tubular mount 212,211 extending rearwardly.

The seat strut 22 has a front seat end 221 and an intermediate support portion which extends rearwardly and downwardly from the front seat end 221, which is adapted to support a saddle 70, and which terminates at a rear seat end 222 that is disposed upwardly and forwardly of the rear wheel axle 44 in the position of use and that is in the form of a tubular mount. The front seat end 221 has a pair of lugs which are pivotally connected to the tubular mount 211 of the upper head portion about a first pivot axis (A) parallel to the front wheel axis of the front wheel axle 43.

The first bracing strut 23 has a first front end 235 which has a pair of lugs that are pivotally connected to the tubular mount 212 of the lower head portion about a third pivot axis (C) parallel to and offset from the front wheel axis of the front wheel axle 43, and a first rear end 231 opposite to the first front end 235 and in the form of a tubular mount.

The second bracing strut 24 includes a second rear end 241 which has a pair of lugs that are pivotally connected to the tubular mount of the rear seat end 222 about a fourth pivot axis (D) parallel to the rear wheel axis of the rear wheel axle 44, an intermediate bracing portion 242 which extends forwardly from the second rear end 241, and which terminates at a second front end 245 that has a pair of lugs 243 pivotally connected to the tubular mount of the first rear end 231 about a second pivot axis (B) parallel to the first pivot axis (A), and a rear stay 244 which is disposed to interconnect the intermediate bracing portion 242 and the rear wheel axle 44.

The lugs of each of the first front end 235, the front seat end 221, the second rear end 241, and the second front end 245 are spaced apart from each other along a respective one of the third, first, fourth, and second axes (C), (A), (D), (B), and define a central line therebetween, which is transverse to the respective one of the third, first, fourth and second axes (C), (A), (D), (B). A pivot pin 28,26,29,27 extends through the lugs along the respective one of the third, first, fourth and second axes (C), (A), (D), (B) to form a pivot joint. The tubular mount of each of the lower and upper head portions (212,211), the rear seat end 222, and the first rear end 231 extends along the central line of the respective one of the first front end 235, the front seat end 221, the second rear end 241, and the second front end 245 to be inserted between the respective lugs so as to journal the corresponding pivot pin 28,26,29,27 thereon, thereby permitting rotation of the lugs relative to the respective tubular mount. An anti-frictional bearing unit includes two ball bearings 25 which are disposed between each tubular mount and the corresponding pivot pin 28,26,29,27 so as to facilitate the rotation of the lugs relative to the respective tubular mount.

The transmitting device 5 includes a sprocket 51 which is coupled to the second front end 245 of the second bracing strut 24 to permit rotation of the sprocket 51 on the second front end 245 about a rotating axis that is offset from the second pivot axis (B) to drive the rear wheel 42 in a known manner. Specifically, the second front end 245 of the second bracing strut 24 further has a sprocket mount 246 which is disposed upwardly of the corresponding lugs 243 in the position of use and which is disposed to support the sprocket 51 thereon about the rotating axis. The lugs 243 have a sleeving region 247 which is interposed between the pivot joint of the pivot pin 27 and the intermediate bracing portion 242, and which is coaxial with the sprocket mount 246 about the rotating axis.

The locking member 3 includes a locking slot 31 which is disposed on the sprocket mount 246, and a locking lever 32 which is pivotally mounted on the first rear end 231 of the first bracing strut 23 adjacent to the pivot pin 27 and which has a locking end 322 that is disposed to engage the locking slot 31 when the bicycle is in the position of use as shown in FIG. 3 so as to prevent turning of the second bracing strut 24 relative to the first bracing strut 23 about the second pivot axis (B), and an operating end 321 that is loaded with a biasing spring 33 and that is operable to turn the locking end 322 against the biasing action of the spring 33 to enable the locking end 322 to disengage from the locking slot 31 so as to permit the second bracing strut 24 to turn relative to the first bracing strut 23. Moreover, a brace 34 in the form of a C-shaped clamp is disposed on the intermediate bracing portion 242 adjacent to the second front end 245 of the second bracing strut 24.

When the bicycle is in the position of use, as shown in FIG. 3, the locking end 322 of the locking lever 32 engages the locking slot 31 by virtue of the biasing action of the spring 33 so as to maintain the first and second bracing struts 23,24 in a stretched state. Thus, the front and rear wheels 41,42 can stand on aground surface. A stand 20 pivotally mounted to the rear stay 244 may be rested against the ground surface to hold the bicycle upright, or may be displaced away from the ground surface (as indicated by broken lines) to permit the user to ride the bicycle.

Figure 6:
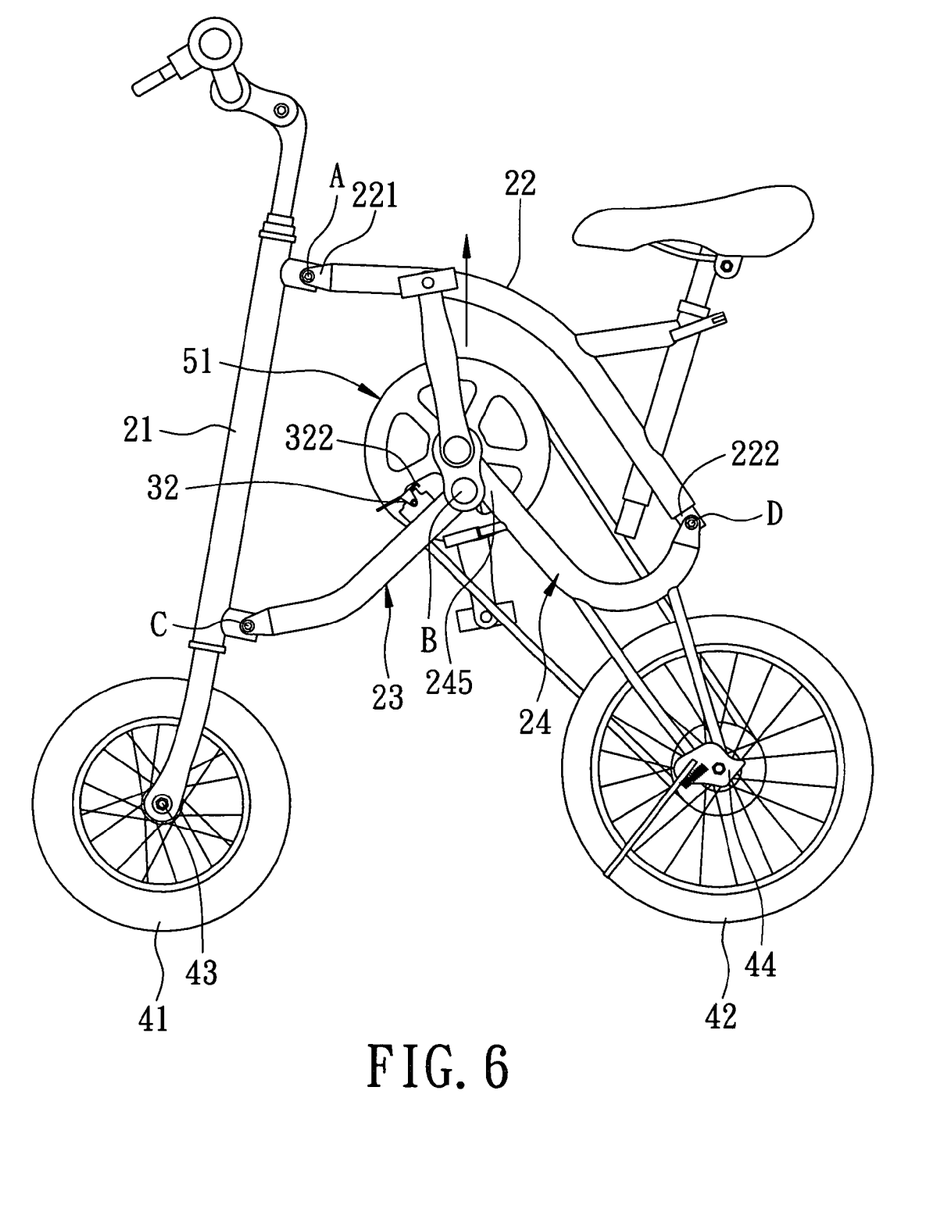
FIG. 6 is a schematic side view of the preferred embodiment when being folded.
Figure 7:
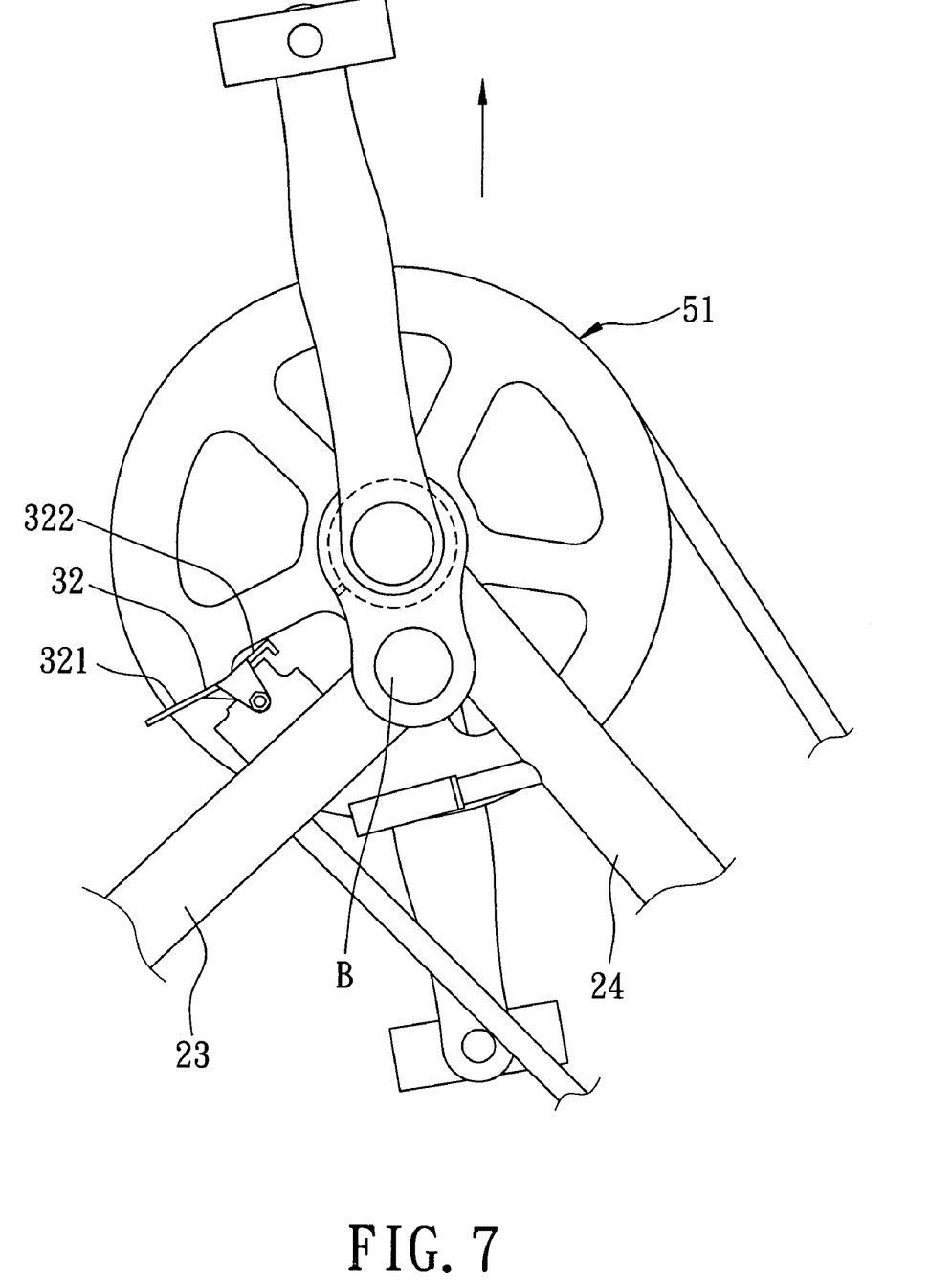
FIG. 7 is a fragmentary side view showing that first and second bracing struts are turned downwardly about another pivot joint of the preferred embodiment during a folding operation.
Figure 8:
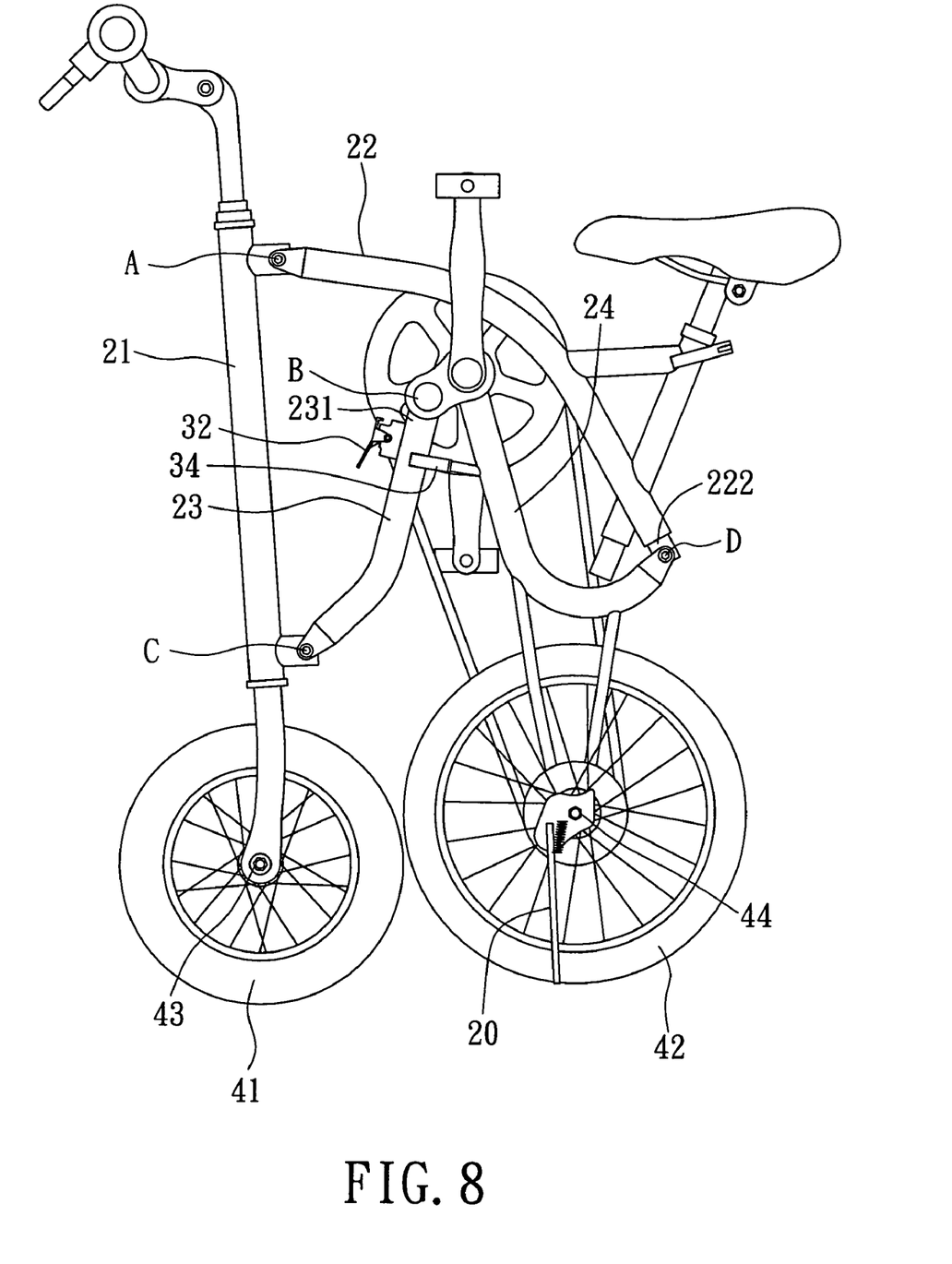
FIG. 8 is a schematic side view of the preferred embodiment after being folded.

When it is desired to fold the bicycle, as shown in FIGS. 6 and 7, the user lifts the sprocket 51 upwardly to lift the second front end 245 of the second bracing strut 24 towards the front seat end 221 of the seat strut 22 so as to result in turning of the second bracing strut 24 relative to the first bracing strut 23 about the second pivot axis (B) and disengagement of the locking end 322 of the locking lever 32 from the locking slot (see FIG. 4), and so as to in turn result in turning of the first and second bracing struts 23,24 about the third and fourth pivot axes (C), (D), respectively, so as to bring the bicycle into a folded position, where the front and rear wheel axles 43,44 are closer to each other in the longitudinal direction and the front and rear wheels 41,42 are held in tandem, and where the rear seat end 222 of the seat strut 22 is disposed rearwardly of the rear wheel axle 44, as shown in FIG. 8. In this position, the brace 34 can be brought to arrest the first bracing strut 23 at a position adjacent to the first rear end 231 so as to ensure that the bicycle is firmly held in the folded position. The stand 20 may be rested against to the ground surface so as to enable the bicycle to stand on the ground surface.

As illustrated, since the front and rear wheels 41,42 are disposed in tandem after folding of the bicycle so that they do not interfere with each other, the folded bicycle can be easily and conveniently pushed along. In addition, the bicycle frame 2 includes four pivot axes (A), (B), (C), (D), and is provided with four anti-friction bearing units such that the folded and unfolded operations of the bicycle are convenient to conduct. The locking lever 32 is biased by the biasing spring 33 to engage the locking slot 31 such that the locking of the bicycle in the position of use is convenient to conduct.

It is noted that since the rear seat end 222 of the seat strut 22 is disposed rearwardly of the rear wheel axle 44 in the folded position as shown in FIG. 8, the folded bicycle in this position is compact. Furthermore, the rear wheel 42 can have a wheel radius larger than that of the front wheel 41 so that when the front wheel 41 rotates, the rider's feet will not come into contact with the front wheel 41.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A foldable bicycle comprising:

front and rear wheel axles which are disposed opposite to each other in a longitudinal direction, respectively extend along front and rear axes oriented in a transverse direction, and are adapted for mounting front and rear wheels, respectively, the front and rear wheels being disposed in tandem in a position of use;

a sprocket which is rotatable about a rotating axis and is adapted to drive the rear wheel;

a head strut having a lower head portion is connected to said front wheel axle, and an upper head portion which is opposite to said lower head portion in an upright direction transverse to the longitudinal and transverse directions and is adapted to couple with a handlebar;

a seat strut having a front seat end is pivotally connected to said upper head portion about a first pivot axis parallel to the front wheel axis, and an intermediate support portion which extends rearwardly and downwardly from said front seat end and is adapted to support a saddle, and terminates at a rear seat end that is disposed upwardly and forwardly of said rear wheel axle in the position of use;

a first bracing strut having a first front end which is pivotally connected to said lower head portion about a third pivot axis parallel to and offset from the front wheel axis, and a first rear end opposite to said first front end;

a second bracing strut including a second rear end which is pivotally connected to said rear seat end about a fourth pivot axis parallel to the rear wheel axis, an intermediate bracing portion which extends forwardly from said second rear end, and terminates at a second front end that is coupled to said sprocket to permit rotation of said sprocket thereon, and a rear stay is disposed to interconnect said intermediate bracing portion and said rear wheel axle, said second front end being pivotally connected to said first rear end about a second pivot axis parallel to the first pivot axis and offset from the rotating axis such that lifting of said second front end of said second bracing strut towards said front seat end results in turning of said first and second bracing struts about the third and fourth pivot axes, respectively, so as to bring said bicycle into a folded position, where said front and rear wheel axles are closer to each other in the longitudinal direction and the front and rear wheels are held in tandem, and where said rear seat end is disposed rearwardly of said rear wheel axle; and a locking member disposed to releasably lock said second bracing strut from turning relative to said first bracing strut when the front and rear wheels are in the position of use.

2. The foldable bicycle of claim 1, wherein each of said first front end, said front seat end, said second rear end, and said second front end has a pair of lugs which are spaced apart from each other along a respective one of the third, first, fourth, and second axes, and define a central line therebetween, which is transverse to the respective one of the third, first, fourth and second axes, and a pivot pin which extends through said lugs along the respective one of the third, first, fourth and second axes to form a pivot joint, each of said lower and upper head portions, said rear seat end, and said first rear end having a tubular mount which extends along the central line of a respective one of said first front end, said front seat end, said second rear end, and said second front end to be inserted between said lugs so as to journal said pivot pin thereon, thereby permitting rotation of said lugs relative to said tubular mount, said foldable bicycle further comprising four anti-frictional bearing units, each of are disposed between said tubular mount and said pivot pin so as to facilitate the rotation of said lugs relative to said tubular mount.

3. The foldable bicycle of claim 2, wherein said second front end further has a sprocket mount which is disposed upwardly of said lugs of said second front end in the position of use and is disposed to support said sprocket thereon.

4. The foldable bicycle of claim 3, wherein said lugs of said second front end have a sleeving region that is interposed between said pivot joint of said second front end and said intermediate bracing portion, and that is coaxial with said sprocket mount about the rotating axis.

5. The foldable bicycle of claim 4, wherein said locking member includes a locking slot disposed on said sprocket mount, and a locking lever is pivotally mounted on said first rear end adjacent to said pivot pin of said second front end and has a locking end that is disposed to engage said locking slot, and an operating end that is loaded with a biasing spring, and that is operable to turn said locking end against biasing action of said spring to enable said locking end to disengage from said locking slot so as to permit said second bracing strut to turn relative to said first bracing strut.

6. The foldable bicycle of claim 1, further comprising a brace is disposed on said intermediate bracing portion adjacent to said second front end and is configured such that said brace is brought to arrest said first bracing strut at a position adjacent to said first rear end once said first bracing strut is displaced to the folded position, thereby ensuring that said bicycle is firmly held in the folded position.

7. A foldable bicycle comprising:

front and rear wheel axles which are disposed opposite to each other in a longitudinal direction, respectively extend along front and rear axes oriented in a transverse direction, front and rear wheels which are respectively journalled on said front and rear wheel axles and are disposed in tandem in a position of use;

a sprocket which is rotatable about a rotating axis to drive said rear wheel;

a head strut having a lower head portion which is connected to said front wheel axle, and an upper head portion which is opposite to said lower head portion in an upright direction transverse to the longitudinal and transverse directions and is adapted to couple with a handlebar;

a seat strut having a front seat end which is pivotally connected to said upper head portion about a first pivot axis parallel to the front wheel axis, and an intermediate support portion which extends rearwardly and downwardly from said front seat end, is adapted to support a saddle, and terminates at a rear seat end that is disposed upwardly and forwardly of said rear wheel axle in the position of use;

a first bracing strut having a first front end which is pivotally connected to said lower head portion about a third pivot axis parallel to and offset from the front wheel axis, and a first rear end opposite to said first front end;

a second bracing strut including a second rear end is pivotally connected to said rear seat end about a fourth pivot axis parallel to the rear wheel axis, an intermediate bracing portion which extends forwardly from said second rear end, and terminates at a second front end that is coupled to said sprocket to permit rotation of said sprocket thereon, and a rear stay which is disposed to interconnect said intermediate bracing portion and said rear wheel axle, said second front end being pivotally connected to said first rear end about a second pivot axis parallel to the first pivot axis and offset from the rotating axis such that lifting of said second front end of said second bracing strut towards said front seat end results in turning of said first and second bracing struts about the third and fourth pivot axes, respectively, so as to bring said bicycle into a folded position, where said front and rear wheel axles are closer to each other in the longitudinal direction and said front and rear wheels are held in tandem, and where said rear seat end is disposed rearwardly of said rear wheel axle; and a locking member disposed to releasably lock said second bracing strut from turning relative to said first bracing strut when said front and rear wheels are in the position of use.

8. The foldable bicycle of claim 7, wherein said rear wheel has a wheel radius larger than that of said front wheel.

* * * * *